US012246350B1

(12) # United States Patent
Perez et al.

(10) Patent No.: US 12,246,350 B1
(45) **Date of Patent: *Mar. 11, 2025**

(54) HIGH G-FORCE VIBRATORY SCREENING APPARATUS

(71) Applicant: FSI Holdings, LLC, Houston, TX (US)

(72) Inventors: Octavio Perez, Houston, TX (US); Ben Hiltl, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,342

(22) Filed: Jan. 12, 2024

(51) Int. Cl.
*B07B 1/42* (2006.01)
*B07B 1/28* (2006.01)

(52) U.S. Cl.
CPC . *B07B 1/42* (2013.01); *B07B 1/28* (2013.01)

(58) Field of Classification Search
CPC .................................... B07B 1/28; B07B 1/42
See application file for complete search history.

(56) References Cited

U.S. PATENT DOCUMENTS 3,899,414 A 8/1975 Hansen
4,444,656 A * 4/1984 Nelson ...................... B07B 1/34 55/300
5,232,099 A * 8/1993 Maynard ................... B07B 1/42 209/276
6,269,953 B1 8/2001 Seyffert
6,401,934 B1 6/2002 Largent
6,439,391 B1 8/2002 Seyffert
6,715,611 B2 4/2004 Crabbe
6,845,868 B1 1/2005 Krush
7,000,776 B2 2/2006 Winkler
7,175,027 B2 2/2007 Strong
7,216,767 B2 5/2007 Schulte
7,278,540 B2 10/2007 Stone
7,331,469 B2 2/2008 Padalino
7,571,817 B2 8/2009 Scott
7,954,644 B2 6/2011 Lease
8,118,172 B2 2/2012 Burnett
9,023,275 B2 5/2015 McClung, III
11,591,868 B1 * 2/2023 Perez ........................ B07B 1/46
2007/0108105 A1 5/2007 Burnett
2014/0217002 A1 * 8/2014 Holton .................. E21B 21/065 210/232
2015/0048037 A1 * 2/2015 Frazier .................... B07B 13/16 210/416.1
2015/0096944 A1 * 4/2015 Krush ....................... B07B 1/40 210/780

* cited by examiner

*Primary Examiner* — Michael McCullough
*Assistant Examiner* — Kalyanavenkateshware Kumar
(74) *Attorney, Agent, or Firm* — Egbert, McDaniel & Swartz, PLLC

(57) ABSTRACT

A vibratory screening apparatus has a frame, a screen assembly affixed to the frame and having a screen with the plurality of spaced openings extending between outer edges of the screen, and a vibration amplifier coupled to the frame into the screen assembly. The screen assembly has a plurality of cross-members extending between sides or ends of said frame. The screen assembly has at least one screen cloth therein. The vibration amplifier is positioned directly beneath the screen assembly. The vibration amplifier is adapted to exert a force against a portion of an underside of the screen assembly.

17 Claims, 6 Drawing Sheets

HIGH G-FORCE VIBRATORY SCREENING APPARATUS

FIELD OF THE INVENTION

The present invention relates to an improved screen assembly for screening a mixture of fluids and solids at high G-forces. In particular, the present invention relates to a screen assembly that withstands high G-forces on a vibratory separator having a vibration amplifier system.

BACKGROUND OF THE INVENTION

A conventional type of vibratory separator comprises a screen assembly driven by two electric or hydraulic motors with unbalanced weights on the end of the motor of the drive shaft of the motors which rotate in opposite directions. The location of the motors facilitates the transference of G-forces generated by the motors to the screen assembly. These G-forces generate a vibratory motion pattern and a constant acceleration. When the slurry or solids are fed to the screen assembly, the G-forces decrease. This limits the amount of energy required to produce an efficient operation. Accordingly, by increasing the G-forces, heavier loads can be processed, fluid capacity can be increased, and separation efficiency can also be increased.

In mineral processing applications, vibratory separators or high-frequency vibrating screens separate solids of different sizes or solids from a liquid phase (depending on the size and shape of the screen openings). Typically, the high-frequency vibrating screen is an angled basket operating between 900 and 1800 r.p.m. This produces G-forces in the range of 4 to 7 G's with orbital or linear motion and a fixed vibration angle.

In other applications, such as oil well drilling, vibratory separators or shale shakers remove certain large particles while allowing certain smaller particles to remain in the fluid. Large particles include drilled solids. The smaller solids may also include drilling fluid additives. The screen assembly on the shale shakers determine the size of the solids to remove based on the size and shape of the screen openings.

The efficiency of the separation is affected by parameters such as fluid flow rates, particle size and drilling fluid properties. These drilling fluid properties can include viscosity, density and solids content. Typically, the shale shaker is a horizontal basket operating at between 1200 and 1800 r.p.m., a G-force in the range of 5 to 7 G's, with linear or balanced elliptical motion, and a fixed vibration angle.

Typically, in the mineral processing industry, the operating parameters that affect screening or separation efficiency are constant. As a result, the design parameters of the vibratory separator are fixed. However, when the operating parameters change, such as in oil well drilling, for example, they can adversely affect overall system performance or separation efficiency. This can lead to solids and/or liquid bypassing and machine overload. One solution to this problem is the manual adjusting of the screen assembly angle, known as the deck angle. A drawback of the solution, however, is that at deck angles greater than 3°, solids grinding or degradation can be a problem. Another known solution is simply to install a coarser mesh on the discharge end. Both of the solutions are unsatisfactory since they are both subjective and involve human error.

A conventional screen assembly comprises a frame with at least one cross member. The frame is spaced apart from the sides. The frame has up to three superimposed contiguous abutting screens for the prevention of clogging or binding. It also has a seal member. There is a need for a screen assembly for a vibratory separator that withstands high G-forces, is durable, is relatively lightweight and easy to handle.

FIGS. 1-2B show a prior art vibratory separator. This is the subject of U.S. Pat. No. 11,591,868, issued on Feb. 28, 2023 to the present Applicant.

Referring to FIG. 1, there is shown the vibratory separator system 1 in accordance with the teachings of the prior art. This vibratory separator system 1 can be extensively used in the industry for diverse applications in mineral processing, food, pharmaceutical, oil and gas, environmental and chemical industries. Typical size separations range from 300 millimeters down to 30 microns. Dry operation is generally limited to material above five millimeters in sizes. Wet operations down to around 70 microns is conventional. In FIG. 1, the vibratory separator system 1 includes a vibratory basket 10, vibrating motors 11*a* and 11*b* and the vibration amplifier 12. The vibratory separator system 1 receives a slurry via an inlet end 13. The slurry is transferred and separated along the screen assembly 14 by a vibratory motion. The solids larger than the size of the screen openings are discharged from the discharge end 15. The remaining portions of the slurry are discharged from the bottom of the vibratory basket 10.

In FIG. 1 it can be seen that the vibratory basket 10 has sides 13*a* and 13*b* arranged in parallel planar relationship to each other. Each of the sides 13*a* and 13*b* extends from the inlet end 13 toward the discharge end 15. The screen material will similarly extend from the inlet end 13 toward the discharge end 15. The vibratory basket 10 is positioned on a skid 14*d*. Skid 14*d* facilitates the ability for the vibratory separator system 1 to be transported to a desired location. Motors 11*a* and 11*b* are conventional vibratory screen motors which are designed with out-of-center weights on a shaft on an interior thereof. The motors 11*a* and 11*b* can be mounted to the side 13*b* of the vibratory basket 10 so as to impart vibratory motion to the basket 10 and to the screen 14 positioned therein.

FIG. 2A shows the vibratory basket 10 having a generally flat screen assembly 14 therein. Screen assembly 14 is comprised of multiple sections 14*d* and 14*b* (along with additional screen sections), as necessary. Screen sections 14*d* and 14*b* are positioned in end-to-end relationship with screen section 14*b* slightly lower than screen section 14*d*. A slurry will enter the inlet end 13 of the vibratory basket 10 and will be processed over the screen assembly 14. Each of the sections 14*d* and 14*b* of screen assembly 14 are fastened to the vibratory basket 10 with pressure wedges 16*a* and 16*b*. The vibratory basket 10 is provided with one or more vibration amplifiers 12 located below the screen assembly 14 in order to amplify the G-forces on the screen assembly 14.

In particular, FIG. 2A shows vibration amplifier 12 as having specific vibration amplifiers 12*a*, 12*b* and 12*c*. It can be seen that vibration amplifier 12*b* will act on the screen assembly 14*b*. Vibration amplifier 12*c* will act on screen assembly 14*d*. Another pressure wedge (such as pressure wedges 16*a* and 16*b*) would be would bear against such a screen by way of an angled strut 17*a*. Any number of flat screens can be used depending on upon the requirements of the vibratory basket.

FIG. 2A also shows the location of the motors 11*a* and 11*b* as positioned at an upper location on the vibratory basket 10. The vibratory screen apparatus 10 of the present invention is further illustrated as mounted on skid 14.

As shown in FIG. 2B, a screen 14*d* is particularly illustrated. The configuration of the remaining screens would be similar to that shown in FIG. 2B. Screen 14*d* is provided with vibration amplifier 12*c* for applying a high G-force beneath a portion of the screen 14*d*. A clamping system, such as pressure wedge 16*a*, secures the screen assembly 14*d* to the vibratory basket 10. The vibration amplifier 12*c* is designed to strike the underside of the screen assembly 14*d* to increase the efficiency of operation as fluids and particles pass over the screen assembly 14*d*. A high G-force, in the range of ten to thirty G's, encourages the passage of fluids and particles smaller than the screen openings. The length of a beater bar 17 is designed to strike a relatively small area on the underside of the screen assembly 14*d*. The area of contact between the beater bar 17 and the screen assembly 14*d* should be less than 40% of the total area of the screen assembly 14*d*, and preferably in the order of 20% to 30% of the total screen area. The vibration amplifier 12*c* is coupled to the frame 18 and is preferably bolted thereto.

FIG. 2B shows that the pressure wedge 16*a* will bear against the screen assembly 14*d*. Angled strut 17*b* will engage with a top surface 16*d* of the pressure wedge 14 so as to cause pressure wedge 16*a* to forcibly bear against the screen assembly 14*d*.

The vibratory basket of the vibratory separator apparatus has side walls. There are one or more screen decks between the side walls. There are supports for the vibration amplifier. The vibratory basket includes a pair of rigid longitudinally extending side beams. A pair of transverse end beams lie in respective planes parallel to each other so as to bridge the ends of the longitudinal side beams. As such, the frame is basically rectangular. The ends of the supports are rigidly secured, normally by welding, to the side walls.

The screen assembly is placed on top of the beater bar. The distance between the screen assembly and the beater bar should be zero in order to keep screen assembly under tension so that the frequency of the vibration amplifier is in phase with the frequency of the vibratory basket. The screen assembly is preferably a pre-tensioned screen so that the amplified vibration is effectively transmitted to the solids slurry and the solids are conveyed easily downstream.

In the past, various patents have issued relating to such vibratory screening systems. For example, an early patent is that of U.S. Pat. No. 3,899,414, issued on Aug. 12, 1975 to L. T. Hansen. This patent describes a vibratory screen separator having an arcuate plate which receives sediment from a plurality of hydrocyclones and distributes the sediment to the separator screen. The arcuate plate collects the sediment from a plurality of discharge positions and presents it to a centrally positioned outlet where it can fall onto a separator screen. The arcuate plate is itself positioned on the vibratory screen separator and is caused to vibrate therewith. The arcuate plate in combination with a grate over the centrally positioned outlet also provides a cover for the separator to prevent large objects from damaging the screen.

U.S. Pat. No. 6,269,953, issued on Aug. 7, 2001 to Seyffert et al., discloses a vibratory separator screen assembly which has at least two ridge-valley series of screening material with a plurality of alternating ridges and valleys of screening material. There is at least one flat area of screening material adjacent to the ridge-valley series.

U.S. Pat. No. 6,401,934, issued on Jun. 11, 2002 to Largent et al., teaches a ramped screen and vibratory separator system. The screen assembly has a base, at least one layer of screening material on the base, and at least one ramp formed in the layer of screening material.

U.S. Pat. No. 6,439,391, issued on Aug. 27, 2002 to K. W. Seyffert, shows a vibratory separator apparatus for separating components of a fluid stream fed to the vibratory separator apparatus. The vibratory separator apparatus has a separator apparatus for separating components of the fluid material stream and a heating apparatus for heating the fluid material stream.

U.S. Pat. No. 6,715,611, issued on Apr. 6, 2004 to Crabbe et al., provides a vibratory separator for separating components of material introduced thereto. The vibratory separator is a shale shaker. The vibratory separator includes a basket for holding the screening apparatus. The basket has two sides spaced-apart at a first end at which the material is introduced into the basket and a second end spaced away from the first end. Components separated from the material exit the basket from the second end. A vibrating apparatus is connected to the basket for vibrating the basket. The screening apparatus is mounted in the basket. The screening apparatus has at least a first portion and a second portion. The first portion is at the first end of the screen and is lower in the basket than the second portion. A receptacle is below the screening apparatus for receiving material components flowing through the screening apparatus.

U.S. Pat. No. 6,845,868, issued on Jan. 25, 2005 to Krush et al., describes a vibratory separator which includes a multi-frequency vibratory adapter system that converts the single frequency vibration into multiple-frequency vibrations of the screen or sieve surface. The peak acceleration caused by the multi-frequencies at least an order of magnitude greater than the main frequency acceleration. A disadvantage of the system is the generation of frequencies that are out-of-phase. This is detrimental to the conveyance of solids.

U.S. Pat. No. 7,000,776, issued on Feb. 21, 2006 to Winkler et al., teaches a screen assembly for vibratory separators. The screen assembly includes a first screen portion having a first end and a second end spaced away from the first end. A second screen portion is adjacent to the second end of the first screen portion. The second screen portion projects downwardly from the second end of the first screen portion.

U.S. Pat. No. 7,175,027, issued on Feb. 13, 2007 to Strong et al., discloses a screen assembly and a vibratory separator. The vibratory separator serves to separate components of material introduced therein. The vibratory separator includes a basket, a collection receptacle beneath the basket and a deck on the basket for mounting the screen assembly thereon. The deck has a plurality of deck pins projecting upwardly therefrom. A screen assembly is positioned on the deck. The screen assembly includes screening material. The screening material has a plurality of openings therethrough suitable for the flow of fluid therethrough. The screening material has a plurality of spaced-apart screen holes therethrough. A holding apparatus is provided for holding the screen assembly on the deck with a part of a deck pin in each screen hole.

U.S. Pat. No. 7,216,767, issued on May 15, 2007 to Schulte et al., teaches a screen basket and shale shaker. The screen mounting basket for a vibratory separator serves to separate components of material introduced into the basket. The vibratory separator includes a collection receptacle beneath the basket. The basket includes two opposed spaced-apart side walls having first ends and second ends. The first ends are spaced-apart by spaced-apart end walls connected to each of the side walls. A basket bottom is located between the two spaced-apart side walls. At least one screen assembly is positioned vertically in the basket for intercepting material introduced into the basket and for screening this material. The screen assembly extends from one side wall of the basket to the other.

U.S. Pat. No. 7,278,540, issued on Oct. 9, 2007 to Stone et al., discloses a vibratory separator having a base, a basket movably mounted on the base for supporting a screen apparatus for treating material introduced into the vibratory separator. The basket is located on a base and is pivotable with respect thereto. The vibratory apparatus is connected to the basket for vibrating the basket. The screen apparatus is supported by the basket. An angle adjustment apparatus is connected to the basket for adjusting an angle of the basket. A sensor senses a parameter indicative of basket angle and provides a signal corresponding to this basket angle. A control apparatus receives signals from the sensor apparatus and controls the basket angle based upon the signals. The angle adjustment apparatus includes a rocker arm assembly with a first pivotable end.

U.S. Pat. No. 7,331,469, issued on Feb. 19, 2008 to Padalino et al., discloses a vibratory separator with an automatically adjustable beach. The vibratory separator has a basket for supporting a screen apparatus for treating material. The basket is pivotally mounted on a base. The vibratory apparatus is connected to the basket for vibrating the basket. A beach is formed on the screen apparatus. A measurement device is connected to the basket and positioned above the screen for measuring a distance from the measurement apparatus to a top surface of the pool. A control apparatus controls and communicates with the measurement apparatus for receiving signals therefrom which is indicative of a pool depth. An adjustment apparatus is used for adjusting the angle of the basket and adjusting the extent of the beach.

U.S. Pat. No. 7,571,817, issued on Aug. 11, 2009 to Scott et al., provides an automatic separator or shaker with an electromagnetic vibrator apparatus. This vibratory separator has a base, a basket movably mounted on the base, a screen on the basket, in which a least a portion of the screen is not inclined downhill. An electromagnetic vibratory apparatus is connected to the basket for vibrating the basket in the screen apparatus. A driving apparatus drives the electromagnetic vibratory apparatus. The control apparatus controls the driving apparatus and the electromagnetic vibratory apparatus.

U.S. Pat. No. 7,954,644, issued on Jun. 7, 2001 to Lease et al., teaches a separator system having a first trough having an inlet end, a downstream outlet end and a trough floor. A first screen section is supported in the trough and is spaced from the trough floor. The first screen section has a first end at the second downstream end. A material-retaining surface is disposed at the downstream end of the first screen section. The material-retaining surface is disposed at an angle relative to the first screen section in order to limit the movement of material across the first screen section. A vibratory generator is coupled to the trough.

U.S. Pat. No. 8,118,172, issued on Feb. 21, 2012 to G. A. Burnett, shows a shale shaker with cartridge screen assembly. The screening apparatus includes a vibratable box connected via vibration isolators within a container. The box includes a screening apparatus thereon. The vibratory separator has replaceable screening cartridges within a container.

U.S. Pat. No. 9,023,275, issued on May 5, 2015 to G. L. McClung, provides shale shakers and separators with real-time monitoring of operation. A killing apparatus serves to kill living things in a fluid flowing from the separator or shaker. A heating apparatus is provided for heating the material fed into or flowing from the separator or shaker.

U.S. Patent Application Publication No. 2007/0108105, published on May 17, 2007 to G. A. Burnett, discloses an upflow shaker and separator. In particular, the separator system includes a container, a screen apparatus with a box, and at least one screen on the box. The screen has a plurality of holes therethrough through which the liquid is passable and through which the solids are not passable. A vibratory apparatus vibrates the box and the screen. The material to be treated is flowable up to the screen and liquid in the material as flowable to and through the screen. A primary conveyor is located beneath the screen for removing solids from liquid.

U.S. Patent Application Publication No. 2007/0108106, published on May 17, 2007 to G. A. Burnett, provides a vibratory separator system including a basket for containing material to be treated by vibratory action. The screen apparatus in the basket screens solids from the material. The screening apparatus includes a screen support with at least one screen through which liquid in the material is passable and through which solids in the material are not passable. A first vibratory apparatus is secured to the screen support for vibrating the screen support and thereby vibrating the screen. A second vibratory apparatus is connected to the screen for vibrating the screen.

It is an object of the present invention to provide a vibratory screening apparatus that screens a mixture of fluids and solids.

It is another object of the present invention to provide a vibratory screening apparatus that withstands high G-forces.

It is another object of the present invention to provide a vibratory screening apparatus that is durable.

It is another object of the present invention to provide a vibratory screening apparatus that is relatively lightweight.

It is another object of the present invention to provide a vibratory screening apparatus that is easy to handle.

It is another object of the present invention to provide a vibratory screening apparatus that has enhanced screen efficiency.

It is still another object of the present invention to provide a vibratory screening apparatus that provides higher G-forces.

It is still a further object of the present invention to provide a vibratory screening apparatus that is less prone to clogging.

It is still a further object of the present invention to provide a vibratory screening apparatus that has optimum performance.

These and other objects and advantages of the present invention will become apparent from a reading of the attached specification and appended claims.

BRIEF SUMMARY OF THE INVENTION

The present invention is a vibratory screening apparatus that comprises a frame, a screen assembly affixed to the frame and having a screen with a plurality of spaced openings extending between outer edge portions of the screen, and a vibration amplifier coupled to the frame and to the screen assembly. The screen assembly has a plurality of cross-members extending between sides or ends of the frame. The screen assembly has at least one screen cloth therein. The vibration amplifier is positioned directly beneath the screen assembly. The vibration amplifier is adapted to exert a force against a portion of an underside of the screen assembly.

In the present invention, the plurality of cross-members includes a first plurality of cross-members that extends over a top of the screen, and a second plurality of cross-members that extend over a bottom of the screen.

The screen assembly includes a top plate having openings formed therein. This top plate is affixed to the frame. The top plate has an outer periphery folded over and around a portion of the frame. In an embodiment of the present invention, the top plate has the plurality of cross-members affixed thereto. In this embodiment, each of the plurality of cross-members has a generally rectangular cross-section. The openings of the top plate are generally square in this preferred embodiment.

A seal member is bonded to a bottom of the frame. The screen cloth includes at least a pair of superimposed contiguous abutting screening cloths.

The vibration amplifier extends over 50% to 95% of the total area of the screen. In particular, the vibration amplifier includes a rigid housing and a beater bar extending outwardly of the rigid housing. The beater bar bears against an underside of the screen assembly. The beater bar has a plurality of flexible strips affixed thereto. The plurality of flexible strips are positioned between respective pairs of the plurality of cross-members.

The screen assembly is formed of a material selected from either steel, reinforced plastic, carbon fiber, composites and combinations thereof. The screen assembly is fastened to the vibratory separator apparatus with a plurality of pressure wedges. The vibration amplifier includes a plurality of vibration amplifiers that are positioned beneath the screen assembly.

The present invention is an improved screen assembly for a vibratory separator driven by a pair of drive motors having respective out-of-balance weights arranged to produce acceleration. There is one or more vibration amplifiers located beneath the screen assembly to enhance the separation efficiency by providing higher G-forces on the screen assembly. The present invention has a screen assembly for the vibratory separator that comprises a rigid plate having upper and lower sides and mounted on a square, round or rectangular frame. A plurality of spaced openings in the rigid plate extend in both direction between the outer edge portions. The screen has at least one cross-member that extends from one side of the screen to an opposite side of the screen. The screen has up to three superimposed contiguous abutting screen cloths bonded with adhesive or a powder coating. A seal member is affixed to the frame.

The present invention provides an improved screen assembly for a vibratory screening machine which is less prone to clogging or binding because it is subject to higher G-forces. This facilitates the release of the clogged particles from the screen mesh. The improved screen assembly of the present invention has an increased strength such that it is able to withstand the high G-forces to which it is subjected. The present invention also provides a method and apparatus for screening which ensures optimum performance by increasing the G-forces on the screen assembly.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

The vibratory screening apparatus of the present invention is be used extensively in diverse applications for mineral processing, food, pharmaceutical, oil and gas, environmental and chemical industries. Typical size separations range from 300 millimeters down to 38 microns. Dry operation is generally limited to mere material above 5 millimeters in size. Wet operation will be down to approximately 74 microns.

Figure 3:
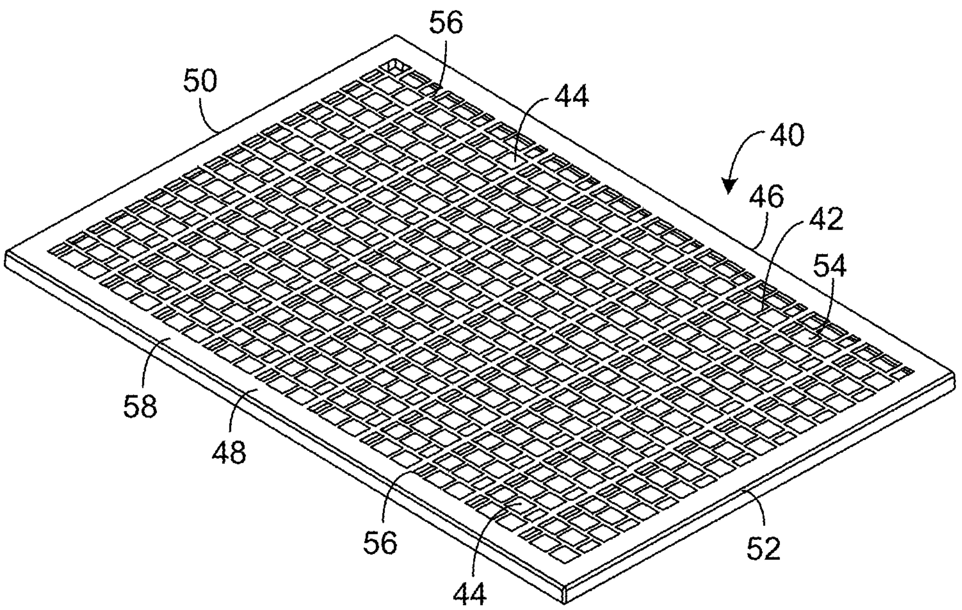
FIG. 3 is an upper perspective view of the screen assembly of the present invention.

Referring to FIG. 3, there is shown the screen assembly 40 in accordance with the teachings of the present invention. The screen assembly 40 has a screen 42 with a plurality of spaced openings 44 extending between sides 46 and 48 of the screen assembly or between ends 50 and 52 of the screen assembly. The screen assembly 40 includes at least one screen cloth 54 positioned beneath the screen 42.

A plurality of cross-members 56 will extend between sides 46 and 48 of the screen assembly 40. Within the concept of the present invention, these cross-members 56 can also extend between the ends 50 and 52. FIG. 3, showing a top view of the screen assembly 40, shows that the plurality of cross-members 56 has a first plurality of cross-members that extend over a top of the screen 42. In the preferred embodiment of the present invention, each of the cross-members 56 will have a generally square or rectangular cross-section in a plane transverse to the surface of the screen 42. However, a variety of other geometric configurations can also be appropriate for the cross-member 56.

In particular, it can be seen in FIG. 3 that the screen assembly has a top plate 58 that has the plurality of openings 44 formed therein. The plurality of cross-members 56 are affixed to this top plate 58. In particular, the top plate 58 can include the cross-members 56 integrally formed therewith along with the openings 42 integrally formed therewith.

Figure 4:
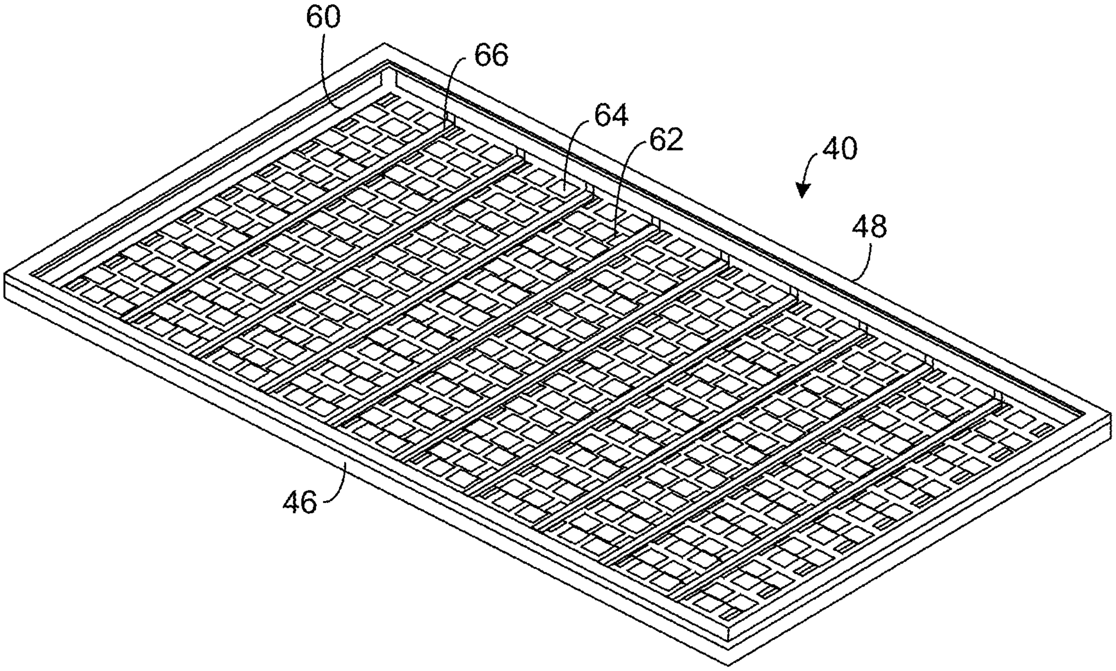
FIG. 4 is a bottom perspective view of the screen assembly of the present invention.

FIG. 4 shows a bottom view of the screen assembly 40. In particular, in FIG. 4, it can be seen that the top plate 58 is folded around at least a portion of a periphery of a frame 60. A bottom plate 62 having a plurality of openings 64 is affixed to the screen assembly. Cross-members 66 will extend between sides 46 and 48 of the screen assembly 40.

Figure 5:
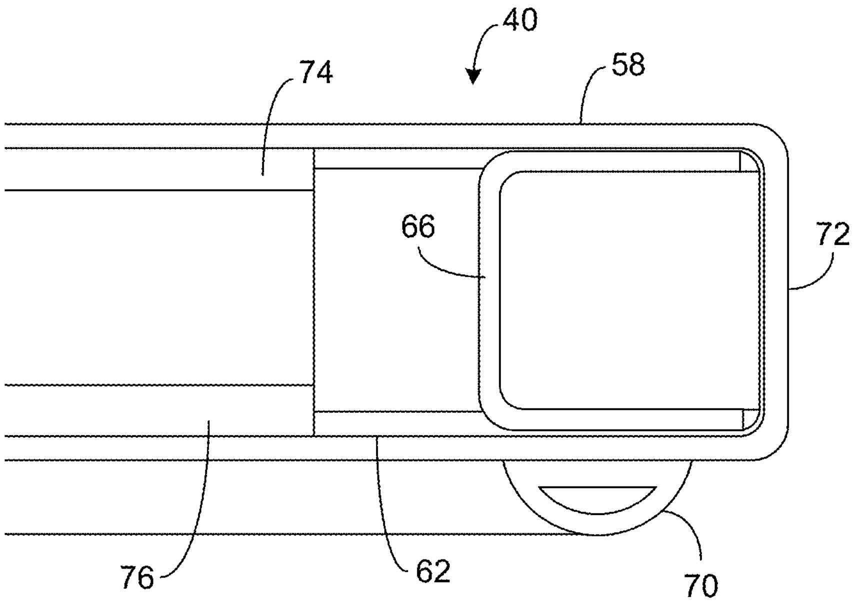
FIG. 5 is an enlarged view of a portion of the screen shown in FIG. 3.

FIG. 5 shows that the top plate 58 has an outer periphery that is folded over and around a portion of the frame 60. The frame 60 has a generally rectangular or square frame that is formed around the periphery of the screen assembly 40. A seal member 70 will be affixed to the bottom of the frame 60 and/or to the bottom of the folded portion 72 of the top plate 58. This configuration of the folding of the outer periphery of the top plate 58 assures a secure and solid connection between the top plate 58 and the frame 60. The seal member 70 will provide a surface upon which the screen assembly 40 can rest. The screen cloths 74 and 76 are particularly shown in FIG. 5. The screen cloth 74 will extend below the top plate 58. The screen cloth 76 will extend above the bottom plate 62. The seal member 70 is illustrated as extending longitudinally across the bottom plate 62.

Referring to FIGS. 3-5, it can be seen that the screen assembly 40 of the present invention includes a rigid generally flat top plate 58. This top plate 58 is folded around the rectangular or square frame 60. The top plate 58 includes a plurality of spaced openings 44 over which slurries, liquids or jet dry solids are processed. These slurries, liquids or dry solids are processed across the rigid top plate 58 in both directions between outer edge portions 46, 48, 50 and 52 of the top plate 58.

The screen assembly 40 has the cross-members 56 preferably rigidly welded thereto. These cross-members 56 will extend from one side of the frame 60 to the other side of the frame. The frame 60 has up to three superimposed contiguous abutting screen cloths bonded with adhesive or powdered coating. Seal member 70 is affixed to a bottom of the frame 60. The openings 44 in the top plate 58 are generally square. However, in alternative embodiments, they may be of different shapes. This pattern of openings 44 is formed by any suitable machine or cutting tool. In particular, these can be formed by a punch, a plasma beam, or a laser. The overall dimensions of the screen openings 44 will be approximately 31 millimeters by 31 millimeters. However, any other size can be utilized depending on the desired requirements. In an embodiment, the top plate 58 can be welded to the rectangular or square frame 60.

The screen assembly 40 has one, two or more layers of screen cloth or mesh of stainless steel or plastic wire. These layer or layers are bonded to the top plate 58 with a structural adhesive, a powder coating, or other bonding material. The layer or layers of screen cloth have openings between 38 microns and 300 millimeters.

As can be seen in FIG. 4, the underside of the screen assembly 40 is provided with a plurality of cross-members 56 that are spaced apart. These cross-members 56 provide support to the top plate 58. The screen assembly 40 can also include various configurations of cross-members. In certain embodiments, the cross-members can run parallel or perpendicular to the longitudinal edge portions of the screen. The screen assembly may be integrated with two or more cross-members which are welded, bonded with structural adhesive, screwed, riveted, or bolted to the top plate 58. Cross-members 56 may be formed of metal, plastic, polymer, or any other composite material that have suitable structural properties. In the preferred embodiment, the cross-members 56 (of the top plate 58) or the cross member 66 (of the bottom plate 62) have a generally rectangular cross-section of approximately 0.125"×0.125" to about 0.5"×0.5". However, is important to note that these cross-members can be of any other desired size or profile. These dimensions are only set forth herein as a matter of example and not of limitation.

Figure 6:
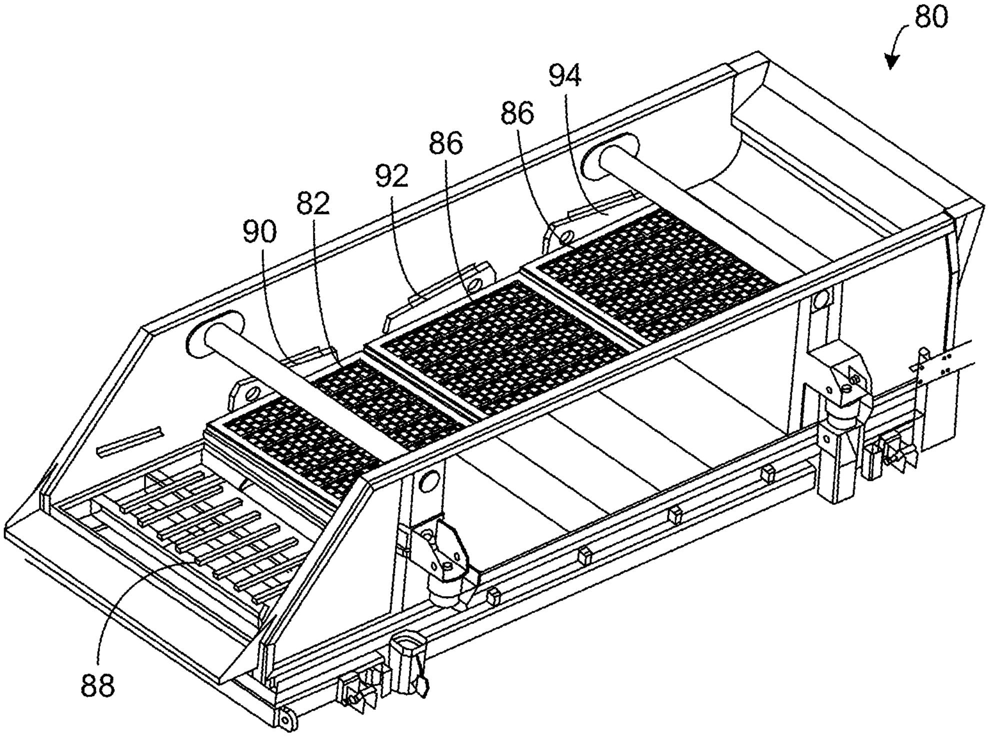
FIG. 6 is an upper perspective view of the vibratory screening apparatus of the present invention as installed on a vibratory separator.

As can be seen in FIG. 5, the top plate 58 is folded around the rectangular or square frame 60. The frame 60 can be formed from C-channel, angle bars, square tube, rectangular tube, or other metal shaped material for structural support. The seal member 70 is bonded to the bottom of the frame 60 so as to seal between the screen assembly 40 and the deck of the vibratory separator (as shown in FIG. 6). Seal 70 is formed of an elastomer, such as nitrile rubber or other flexible materials. The seal 70 can be can have a D-shape, a flat shape, or a circular shape. Seal 70 is bonded to the bottom perimeter of the screen assembly 40 with a structural adhesive. It can also be screwed, riveted, or bolted to the frame 70.

Figure 1:
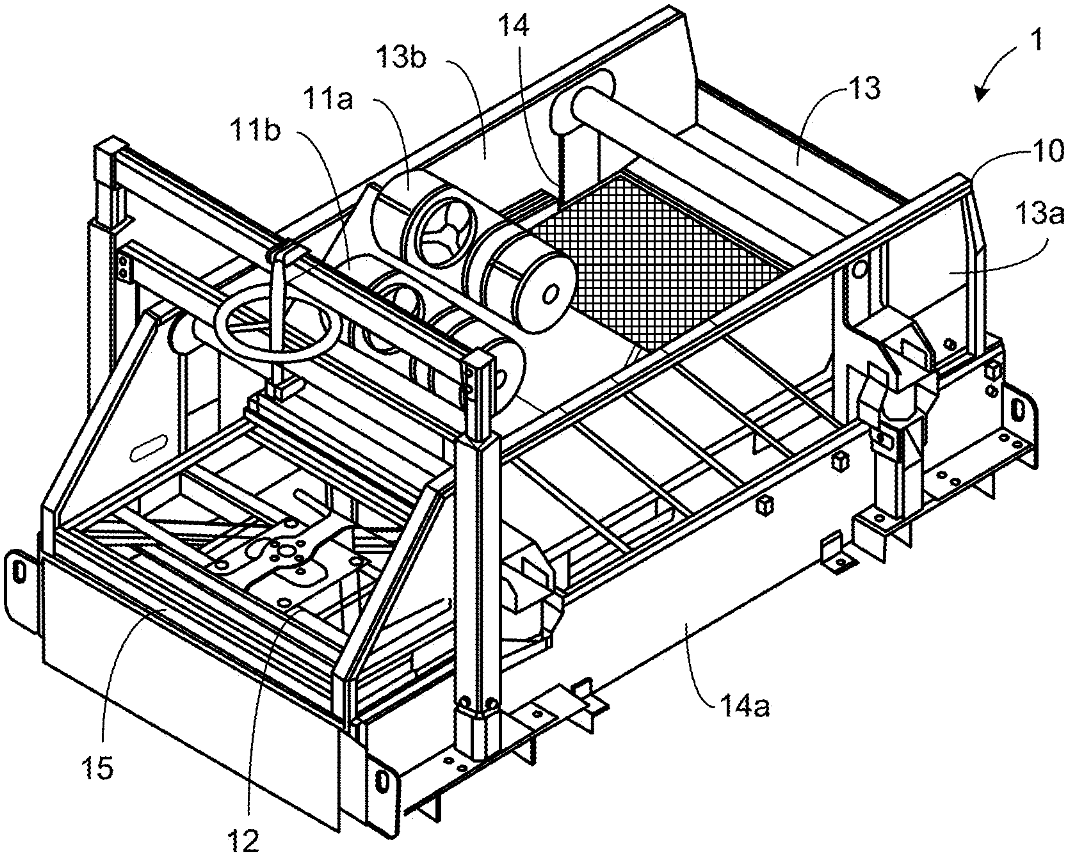
FIG. 1 PRIOR ART
FIG. 1 is an isometric view of the vibratory separator apparatus in accordance with the prior art.
Figure 2A:
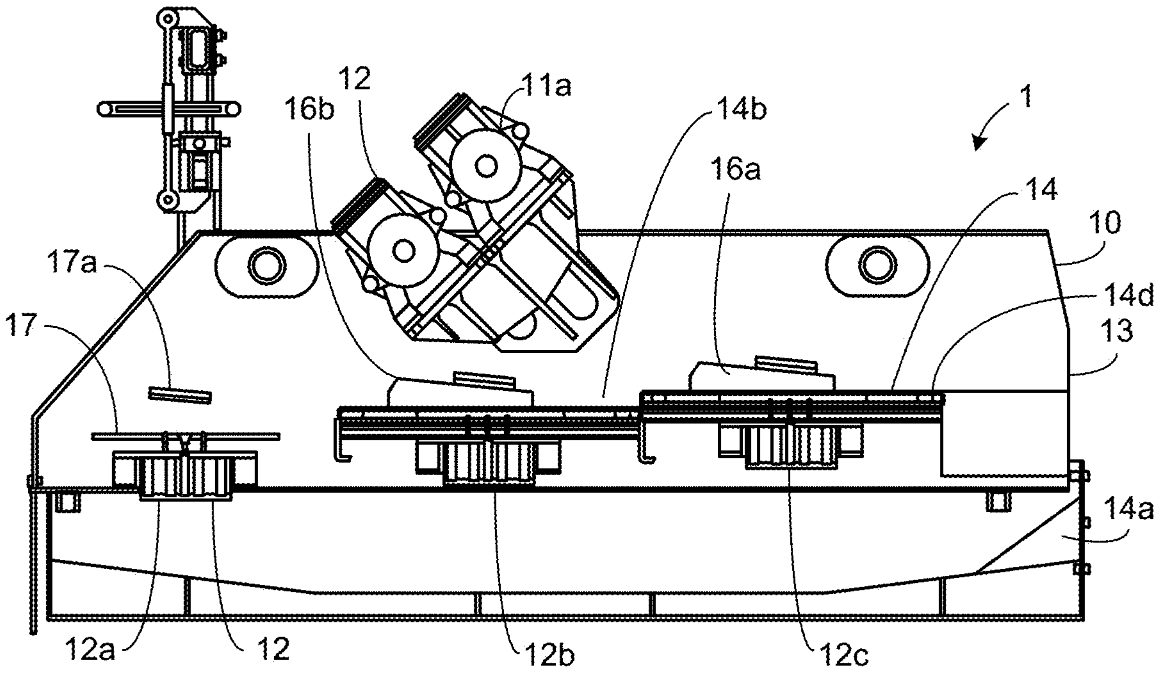
FIG. 2A PRIOR ART
FIG. 2A is a side cross-sectional view of the screen separator of FIG. 1 showing the vibration amplifier system in accordance with the prior art.
Figure 2B:
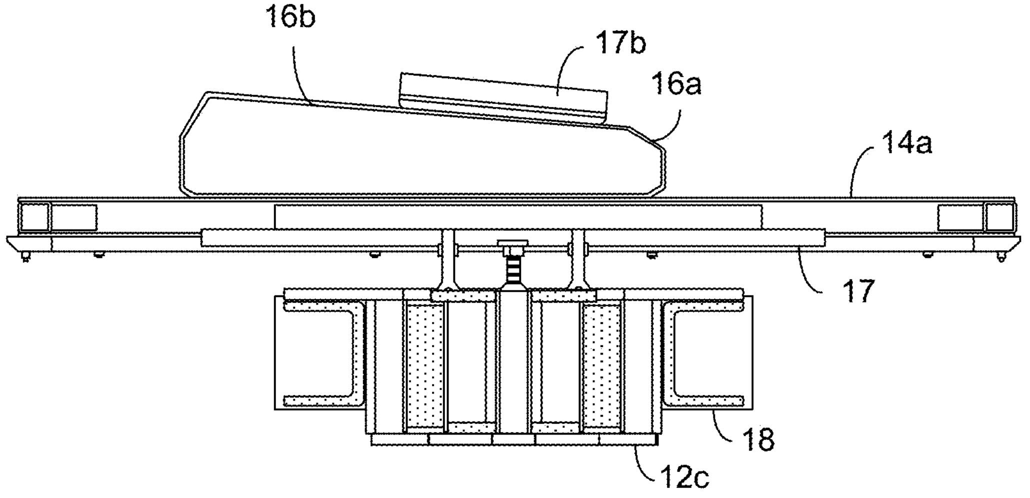
FIG. 2B PRIOR ART
FIG. 2B is a side cross-sectional view of the screen separator of FIG. 1 showing the vibration amplifier system in accordance with the prior art.

FIG. 6 shows a vibratory separator 80 that is generally formed in accordance with the teachings of the prior art (as shown in FIGS. 1-2B). The vibratory separator 80 has three screen assemblies 82, 84 and 86 positioned therein. Screen assemblies 82, 84 and 86 will have a configuration similar to the screen assembly shown herein in connection with FIGS. 3-5. Vibration amplifiers 88 are provided along the length of the vibratory separator 80 and positioned beneath each of the screen assemblies 82, 84 and 86. The screen assembly 82 is fastened to the vibratory separator 80 with a wedge 90. The screen assembly 84 is attached to the vibratory separator 80 with a wedge 92. The screen assembly 86 is affixed to the vibratory separator 80 with a wedge 94. Various other mechanical connection systems can also be used so as to secure the screen assemblies 82, 84 and 86 in their proper positions within the vibratory separator 80.

The vibratory separator 80 is provided with one or more of vibration amplifiers 88 located below the screen assemblies 82, 84 and 86. These vibration amplifiers 88 serve to amplify the G-forces on the screens. Within the concept of the present invention, it is possible to have any number of flat screen assemblies. This will depend on the particular design of the vibratory separator 80. The present invention operates equally well regardless of the number of screen assemblies.

Figure 7:
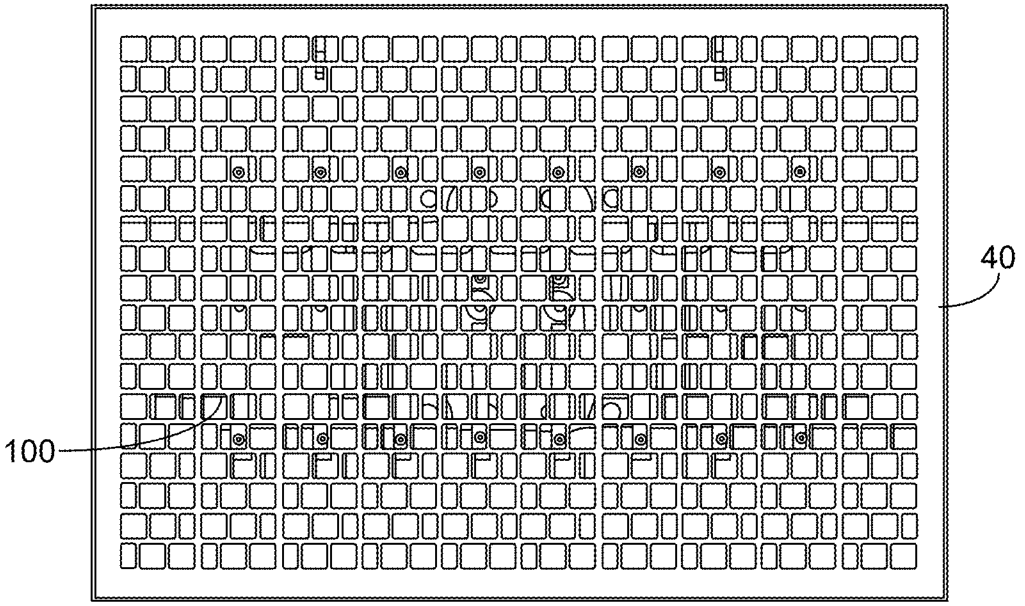
FIG. 7 is a plan view of the screen assembly of the present invention with the vibration amplifier illustrated therebeneath.

FIG. 7 shows the screen assembly 40 as positioned directly above the vibration amplifier 100 of the present invention. The vibration amplifier 100 will apply a high G-force to a portion of the screen assembly 40. The vibration amplifier 100 is designed to strike the underside of the screen assembly 40 in order to increase the efficiency of separation as fluids and particles pass over the top plate 58. This can create a high G-force in the range of 10 to 30 G's. It encourages the passage of fluids and particles smaller than the screen openings. The size of the vibration amplifier 40 is designed to strike a relatively large area of the underside of the screen assembly 40. This area will be approximately 50% to 95% of the total screen area.

Figure 8:
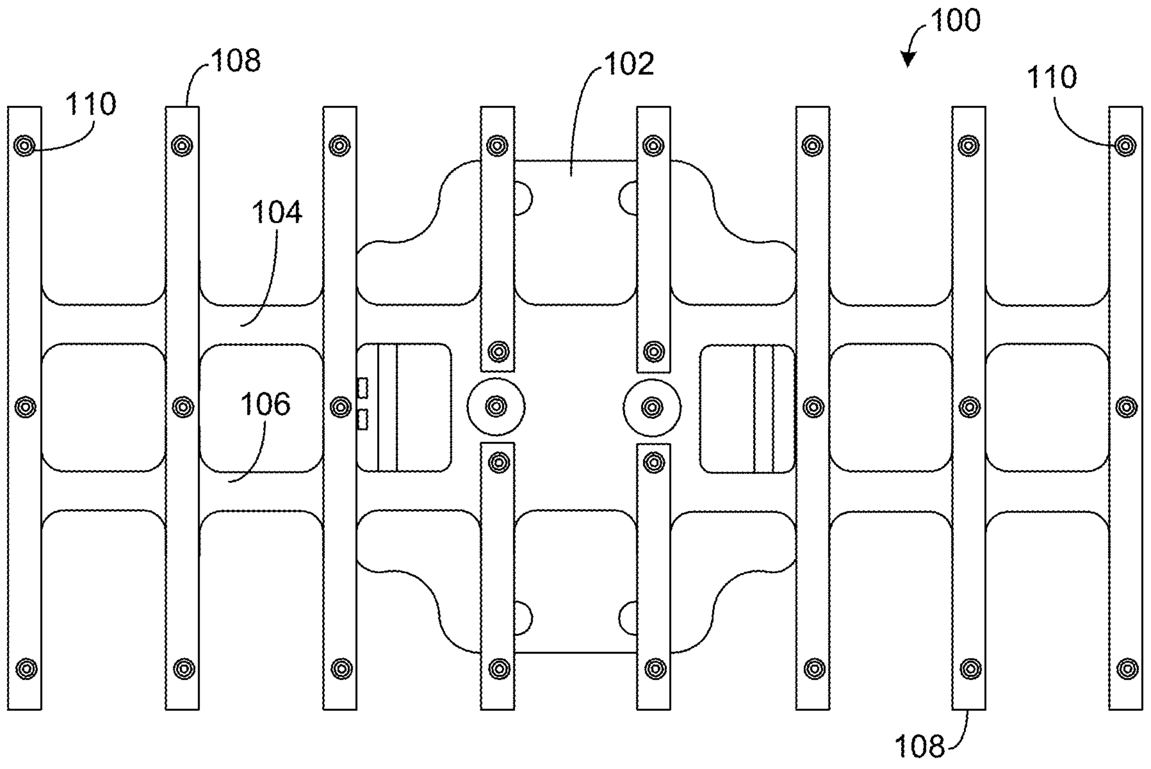
FIG. 8 is an isolated plan view showing the vibration amplifier in accordance with the teachings of the present invention.

FIG. 8 shows a detailed view of the vibration amplifier 100 as used in the present invention. The vibration amplifier 100 includes a rigid housing 102 and beater bars 104 and 106 extending outwardly of the rigid housing 102. The beater bars 104 and 106 include a plurality of flexible strips 108 affixed thereto. The flexible strips 108 can be fastened to the beater bars 104 and 106 through the use of rivets 110. Alternatively, screws, bolts or adhesives can be used so as to secure the flexible strips 108 to the beater bars 104 and 106. The flexible strips 108 are formed of a shock-absorbing material, such as an elastomer or plastic.

Figure 9:
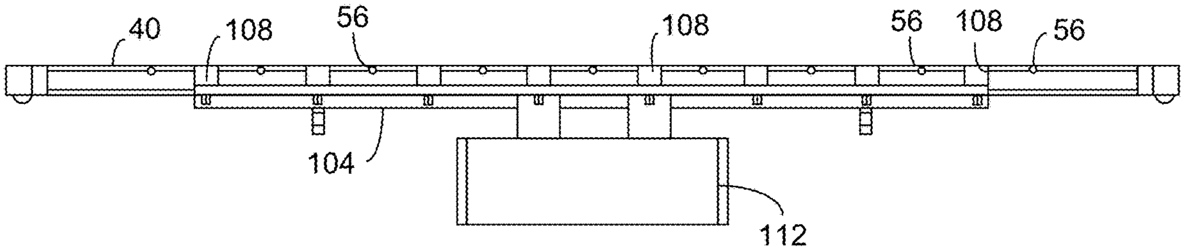
FIG. 9 is a side view showing the vibration amplifier system is a side elevational view showing the vibration amplifier system of the present invention installed in association with the screen assembly.

FIG. 9 shows that the beater bars 104 and 106 are driven by a motor 112. In FIG. 9, can be seen that the screen assembly 40 is positioned above the beater bars 104 and 106 and above the motor 112 connected to the beater bar 104. Beater bar 104 has a total of eight flexible strips 108 positioned between the cross-members 56. In particular, it can be seen that the eight flexible strips 108 are positioned directly between adjacent pairs of the cross-members 56. The spacing between the cross-members 56 is approximately one inch to about four inches depending on the number of strips on the beater bar 104. In use, the screen assembly 40 is mounted on the vibratory separator 80 with the vibration amplifier 100 coupled to the vibratory separator 80. The screen assembly will resist the striking action of the beater bar 104 at G-forces in the range of 10 to 30 G's. The screen assembly 40 must be very rigid and lightweight. Preferably, the screen assembly 40 is formed of high-strength steel, reinforced plastic, carbon fiber, composite materials or other materials with the necessary structural properties.

The foregoing disclosure and description of the invention is illustrative and explanatory thereof. Various changes in the details of the illustrated construction can be made is the scope of the present invention without departing from the true spirit of the invention. The present invention should only be limited by the following claims and their legal equivalents.

We claim:

1. A vibratory screening apparatus comprising:
- a frame;
- a screen assembly affixed to said frame and having a screen with a plurality of spaced openings extending between outer edge portions of said screen, said screen assembly having a plurality of cross-members extending between sides or ends of said frame, said screen assembly having at least one screen cloth therein; and
- a vibration amplifier coupled to said frame and said screen assembly, said vibration amplifier positioned directly beneath said screen assembly, said vibration amplifier adapted to exert a force against a portion of an underside of said screen assembly, said vibration amplifier comprising:
  - a rigid housing; and
  - a beater bar extending outwardly of said housing, said beater bar bearing against the underside of said screen assembly, said beater bar having a plurality of flexible strips affixed thereto.

2. The vibratory screening apparatus of claim 1, wherein said plurality of cross-members comprises:
- a first plurality of cross-members extending over a top of the screen; and
- a second plurality of cross-members extending over a bottom of the screen.

3. The vibratory screening apparatus of claim 1, said screen assembly comprising a top plate having openings formed therein, said top plate being affixed to said frame.

4. The vibratory screening apparatus of claim 3, said top plate having an outer periphery folded over and around a portion of said frame.

5. The vibratory screening apparatus of claim 3, the top plate having a plurality of cross-members directly affixed thereto.

6. The vibratory screening apparatus of claim 5, wherein each of the plurality of cross-members has a generally rectangular cross-section.

7. The vibratory screening apparatus of claim 3, wherein the openings of said top plate are generally square.

8. The vibratory screening apparatus of claim 1, said frame having a seal member bonded to a bottom of said frame.

9. The vibratory screening apparatus of claim 1, the at least one screen cloth comprising at least a pair of superimposed contiguous abutting screen cloths.

10. The vibratory screening apparatus of claim 1, the plurality of cross-members extending perpendicular to the longitudinal edge portions of said screen.

11. The vibratory screening apparatus of claim 1, said vibration amplifier extending across 50% to 95% of a total area of the screen.

12. The vibratory screening apparatus of claim 1, the plurality of flexible strips positioned between respective pairs of the plurality of cross-members.

13. The vibratory screening apparatus of claim 1, said screen assembly being formed of a material selected from the group consisting of steel, reinforced plastic, carbon fiber, composites and combinations thereof.

14. The vibratory screening apparatus of claim 1, said screen assembly being fastened to the vibratory separator apparatus with a plurality of pressure wedges.

15. The vibratory screening apparatus of claim 1, said vibration amplifier comprising a plurality of vibration amplifiers positioned beneath said screen assembly.

16. A vibratory screening apparatus comprising:
- a frame;
- a screen assembly affixed to said frame, said screen assembly having a top plate with openings formed therein, said screen assembly having a plurality of cross-members extending between ends or sides of said frame, said screen assembly having at least one screen cloth positioned the beneath the top plate;
- a vibration amplifier coupled to said frame and to said screen assembly, said vibration amplifier positioned directly beneath said screen assembly, said vibration amplifier adapted to exert a force against an underside of said screen assembly, the vibration amplifier comprising:
  - a housing; and
  - a beater bar extending outwardly of said housing, said beater bar bearing against an underside of said screen assembly, said beater bar having a plurality of flexible strips affixed thereto, said plurality of flexible strips positioned between respective pairs of said plurality of cross-members.

17. The vibratory screening apparatus of claim 16, wherein said top plate has an outer periphery folded over and around a portion of said frame.

* * * * *